Feb. 6, 1923.
N. A. ORMES
TRUCK
Filed Apr. 8, 1921
1,444,356
2 SHEETS-SHEET 1
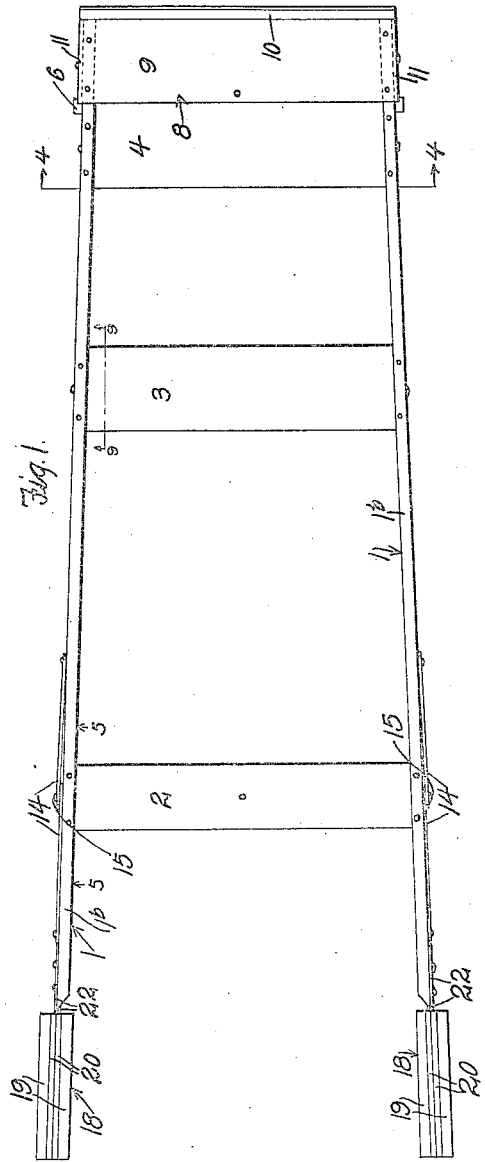
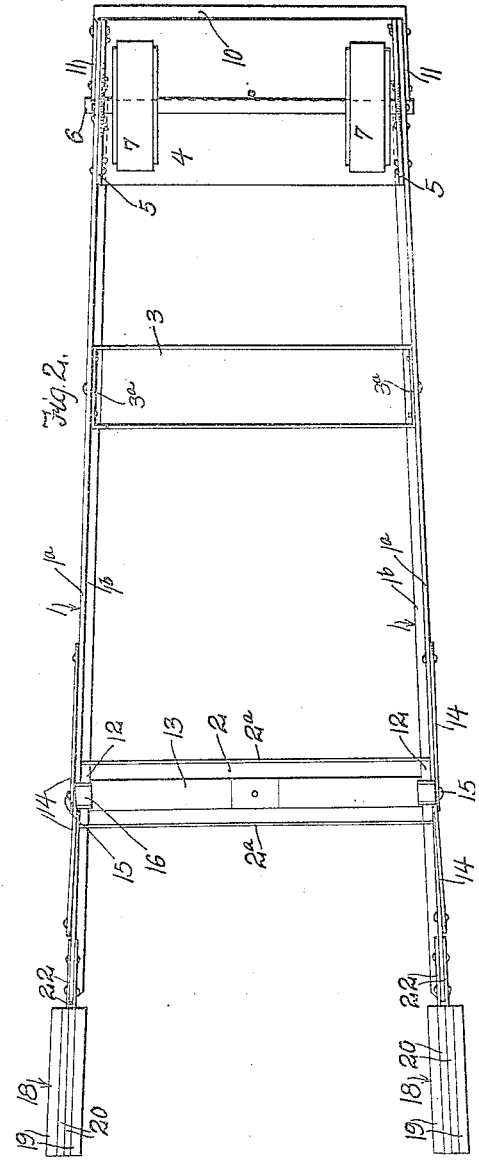
INVENTOR
Norman A. Ormes

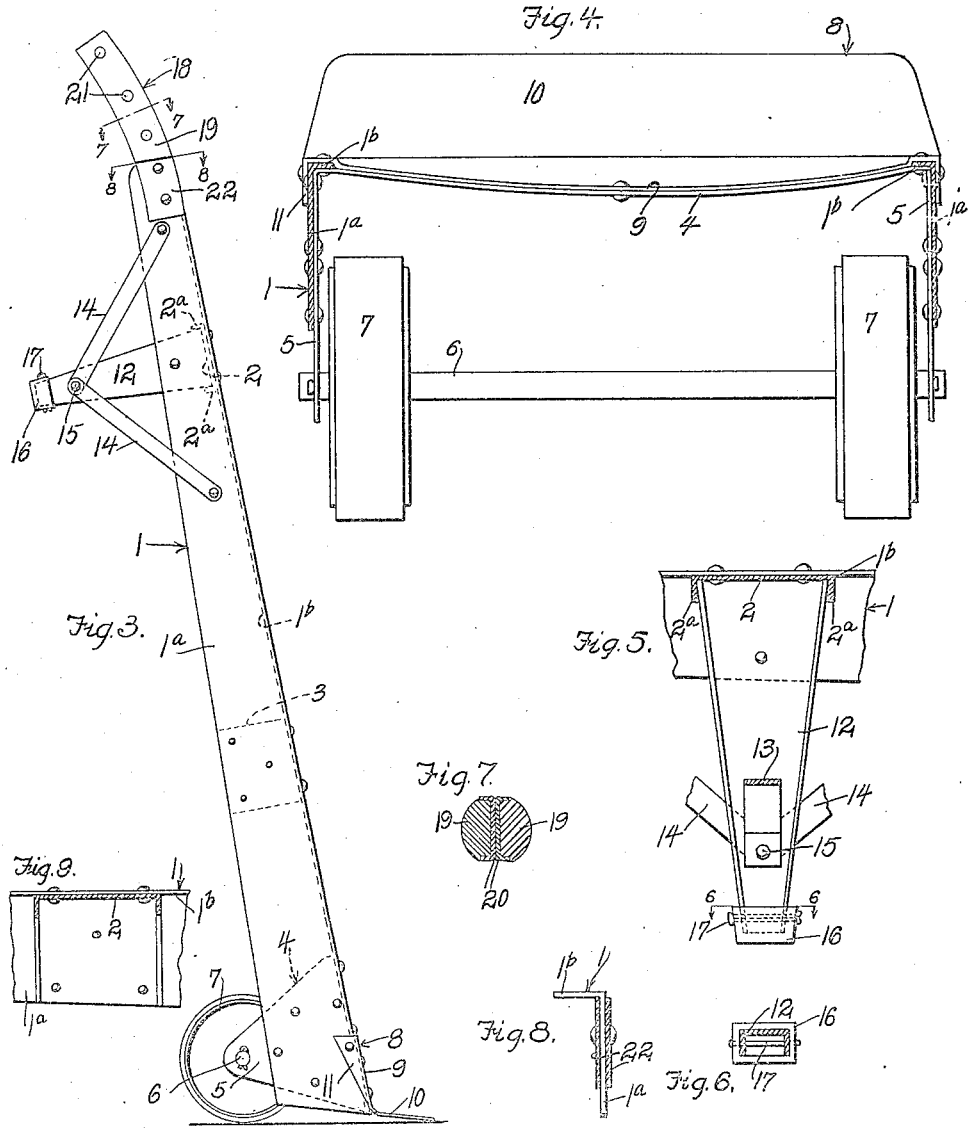

Patented Feb. 6, 1923.

1,444,356

UNITED STATES PATENT OFFICE.

NORMAN A. ORMES, OF PITTSBURGH, PENNSYLVANIA.

TRUCK.

Application filed April 8, 1921. Serial No. 459,572.

*To all whom it may concern:*

Be it known that I, NORMAN A. ORMES, a citizen of the United States of America, residing at Pittsburgh, in the county of Allegheny and State of Pennsylvania, have invented new and useful Improvements in Trucks, of which the following is a specification.

This invention relates to trucks, and more particularly to a warehouse truck of the two wheel type.

One of the main objects of the invention is to provide a truck of the character stated of simple construction and which possesses great strength while being comparatively light. Another object is to provide an all metal truck so as to eliminate cracking and splintering such as frequently occurs in wooden trucks, this truck being so constructed and braced as to permit the use of sheet metal of light gage in its construction. A further object is to provide an all metal truck in which the various parts are so constructed and related that the truck will remain in upright position to facilitate its use. Further objects will appear from the detailed description.

In the drawings:—

Figure 1 is a top plan view of the truck.
Figure 2 is an underneath plan view.
Figure 3 is a side view of the truck in upright position.
Figure 4 is a section taken substantially on line 4—4 of Fig. 1.
Figure 5 is a section taken substantially on line 5—5 of Fig. 1.
Figure 6 is a section taken substantially on line 6—6 of Fig. 5.
Figure 7 is a section taken substantially on line 7—7 of Fig. 3.
Figure 8 is a section taken on line 8—8 of Figure 3.
Figure 9 is a section taken on line 9—9 of Figure 1.

The body of the truck includes two side rails 1 of angle cross-section which taper in width from the forward or nose end of the truck. These side rails may be readily made by stamping a rectangular sheet of metal to provide a channel member and then cutting this channel member on a slanting line from one end to the other thus producing the two rails. The rails 1 are connected by cross brace bars or strips 2, 3, and 4 formed of sheet metal, these strips being secured to the side rails 1 by riveting or in any other suitable or preferred manner.

The strips 2 and 3 are of channel cross-section thus providing light braces of great strength capable of withstanding the severe strains to which they are subjected in use. Brace strip 3, in addition to being of channed cross-section, is of substantially inverted U-shape and has its arms 3ª riveted to the lateral flanges 1ª of rails 1 so as to materially reinforce the central portion of the truck body. The forward brace strip 4 is relatively broad and is also of inverted U-shape, being riveted to the lateral and top flanges of rails 1 so as to rigidly connect and brace the same. End arms 5 of brace strip 4 project below rails 1 and are preferably, though not necessarily, tapered downwardly as in Figure 3. These arms 5 receive a suitable axle 6 on which are mounted wheels 7 of any suitable or preferred type. A sheet metal nose piece 8 is provided at the forward end of rails. This piece comprises a base plate 9 and a forwardly and upwardly directed nose plate 10 projecting from the forward edge of plate 9. Plate 9 extends across the forward portion of the truck body or frame above brace strip 4 and is provided at each end with a flange 11 which fits snugly about rails 1. The rails and flanges 11 and plate 9 and strip 4 are all secured tightly together by riveting thus providing a very strong structure at the forward or nose portion of the truck which is well capable of withstanding the severe strains to which the forward portion of the truck is subjected. This also serves to materially reinforce nose plate 10 by effectively securing and bracing plate 9.

A downwardly tapering sheet metal leg 12 of channel cross-section fits snugly at its upper end between flanges 2ª of brace strip 2, the web or bight portion of this leg being riveted to flange 1ª of the adjacent rail. A truss brace strip 13 is secured at its center to strip 2, the arms of this strip 13 being positioned within and adjacent to the lower ends of legs 12. Inclined brace strips 14 are secured at their upper ends to flanges 1a of rails 1 and are overlapped at their lower ends adjacent to the lower end of the leg. Each of the legs 12 and the arm of brace 13 and the strips 14 are secured tightly together by a rivet 15. The brace members 13 and 14, and strip 2 co-operate to effectively brace the legs and prevent displacement thereof, this construction permitting the legs to be formed of comparatively light sheet metal. To prevent bending or wear of the lower end of leg 12 I provide a shoe 16 of steel or cast iron which fits snugly over the lower end of the leg and is secured in position by a pin 17, or in any other suitable or preferred manner. This shoe may be readily renewed when desired, as will be understood.

A handle 18 is provided at the rearward or smaller end of each side rail 1. This handle is formed of two suitably shaped pieces of wood 19 which are arched or curved longitudinally and are of approximately semi-elliptical cross-section, these members 19 being secured in sheet-metal channel members 20 and secured together by rivets 21 passing through members 19 and 20. Each of the members 20 is provided at its forward end with a flat strip or extension 22. These extensions fit about, and are riveted to, flange 1a of rail 1, the inner one of the extensions fitting snugly beneath top flange 1b of the rail so as to be braced thereby. The channel members 20 effectively enclose the upper and lower edges of members 19 so as to prevent splintering or breaking of these members, and the channel members also reinforce members 19 so as to produce a handle structure of great strength and very light weight. By constructing the handles and the legs in the manner illustrated and described, and tapering the side rails 1, I produce a truck of great strength and neat appearance in which the greater part of the weight is positioned in front of the axis of wheels 7 when the truck is in upright position as in Figure 3. This insures that the truck will remain in upright position when so placed thus greatly facilitating its use.

A truck constructed in the manner illustrated and described may be readily made of sheet metal of comparatively light gage, and can be quickly and easily produced at small cost. In addition this truck is of lighter weight than the wooden trucks now commonly used while possessing greater strength and avoiding all possibility of cracking and splintering which is a very serious objection to a wooden truck. As will be understood, it may be found by experience to be desirable to make changes in details of construction and arrangement of parts of the invention without departing from the field and scope of the same, and I intend to include all such variations, as fall within the scope of the appended claims, in this application in which a preferred form only of my invention is disclosed.

What I claim is:—

1. In a truck, a frame including side rails, brace strips connecting said rails, one of said strips being of channel cross-section, and leg members of channel cross-section secured to said rails and fitting snugly between the flanges of the channel brace strip, the upper ends of the legs contacting with the underface of said strip.

2. In a truck, side rails of angle cross-section, brace strips of channel cross-section connecting said rails, legs of channel cross-section secured to said rails, a member of substantially inverted U-shape connecting the rails at the forward ends thereof, an axle mounted in the arms of said U-member, wheels mounted on said axle, and a nose member including a base plate and an angularly disposed nose plate, said base plate being positioned upon the U-member and secured to the same and to said rails.

3. A truck handle comprising two channel members positioned back to back and provided each with an extension at its forward end, members fitting into the channel members and co-operating therewith to form a handle, and means for securing all of said members together.

4. In a truck, side rails, brace strips connecting said rails, a member of substantially inverted U-shape secured to the forward ends of the rails and connecting the same, and a nose member including a base plate and an angularly disposed nose plate, said base plate resting upon the U-member and being provided with depending end flanges extending over the outer faces of the side rails, the base plate and the U-member being secured together and the side rails and the arms of the U-member and said flanges being secured together.

5. In a truck, side rails of angle cross-section, the flanges at the upper ends of said rails being directed inwardly, a member of substantially inverted U-shape fitting beneath said flanges and secured to the rails at the forward ends thereof, the arms of said member providing axle supporting means, and a nose member including a base plate and an angularly disposed nose plate, said base plate being positioned upon the U-member and connecting the rails, the base plate being secured to said U-member and to the rails.

6. In a truck, side rails of angle cross-section, the flanges at the upper edges of the rails being directed inwardly, a brace strip of channel cross-section fitting beneath and secured to said flanges, and legs of channel cross-section secured to the inner faces of the rails, the upper ends of said legs fitting snugly between the flanges of said strip and being effectively braced thereby against movement forwardly or rearwardly of the truck.

7. In a truck, side rails, a brace strip of channel cross-section connecting said rails, and legs of channel cross-section secured to the rails and having their upper ends fitting snugly into said strip.

In testimony whereof I affix my signature.

NORMAN A. ORMES.